(12) United States Patent
Denkwitz et al.

(10) Patent No.: US 9,522,968 B2
(45) Date of Patent: Dec. 20, 2016

(54) HIGH PERFORMANCE ZIEGLER-NATTA CATALYST SYSTEMS, PROCESS FOR PRODUCING SUCH MGCL$_2$ BASED CATALYSTS AND USE THEREOF

(71) Applicants: Yvonne Denkwitz, Mannheim (DE); Oliver Schuster, Weinheim (DE); Andreas Winter, Neuleininger (DE)

(72) Inventors: Yvonne Denkwitz, Mannheim (DE); Oliver Schuster, Weinheim (DE); Andreas Winter, Neuleininger (DE)

(73) Assignee: Lummus Novolen Technology GmbH, Mannheim (DE)

( * ) Notice: Subject to any disclaimer, the term of this patent is extended or adjusted under 35 U.S.C. 154(b) by 104 days.

(21) Appl. No.: 14/082,595

(22) Filed: Nov. 18, 2013

(65) Prior Publication Data

US 2014/0148566 A1    May 29, 2014

Related U.S. Application Data

(60) Provisional application No. 61/729,895, filed on Nov. 26, 2012.

(51) Int. Cl.
*C08F 4/10* (2006.01)
*C08F 10/06* (2006.01)

(52) U.S. Cl.
CPC *C08F 4/10* (2013.01); *C08F 10/06* (2013.01)

(58) Field of Classification Search
None
See application file for complete search history.

(56) References Cited

U.S. PATENT DOCUMENTS 4,829,034 A    5/1989    Iiskolan et al.
4,971,937 A    11/1990   Albizzati et al.
(Continued)

FOREIGN PATENT DOCUMENTS

CN    101107275 A    1/2008
EP    0728769 A1    8/1996
(Continued)

OTHER PUBLICATIONS

Chifeng Zhong, Journal of Applied Polymer Science, Oct. 23, 2003, vol. 90, pp. 3980-3986 (2003).
(Continued)

*Primary Examiner* — Ling Choi
*Assistant Examiner* — Catherine S Branch
(74) *Attorney, Agent, or Firm* — Osha • Liang LLP

(57) ABSTRACT

Improved Ziegler-Natta catalysts and methods of making the improved catalyst are described. The Ziegler-Natta catalyst is formed using a spherical MgCl$_2$-xROH support, where R is a linear, cyclic or branched hydrocarbon unit with 1-10 carbon atoms and where ROH is an alcohol or a mixture of at least two different alcohols and where x has a range of about 1.5 to 6.0, preferably about 2.5 to 4, more preferably about 2.9 to 3.4, and even more preferably 2.95 to 3.35. The Ziegler-Natta catalyst includes a Group 4-8 transition metal and an internal donor comprising a diether compound. The catalyst has improved activity in olefin polymerization reactions as well as good stereoregularity and hydrogen sensitivity, and may be useful in the production of phthalate-free propylene polymers having a molecular weight distribution (PI(GPC)) in the range from about 5.75 to about 9.

17 Claims, 2 Drawing Sheets

(56) References Cited

U.S. PATENT DOCUMENTS

| | | | |
|---|---|---|---|
| 5,468,698 | A | 11/1995 | Koskinen et al. |
| 5,905,050 | A | 5/1999 | Koshinen et al. |
| 6,020,279 | A | 2/2000 | Uwai et al. |
| 6,818,583 | B1 | 11/2004 | Morini et al. |
| 6,841,632 | B2 | 1/2005 | Morini et al. |
| 7,772,338 | B2 | 8/2010 | Terreur |
| 2002/0161139 | A1 | 10/2002 | Blackmon et al. |
| 2004/0235645 | A1* | 11/2004 | Morini .................... C07C 41/16 502/103 |
| 2008/0306228 | A1 | 12/2008 | Matsunaga et al. |
| 2010/0069586 | A1 | 3/2010 | Klendworth et al. |
| 2010/0229748 | A1 | 9/2010 | Oron et al. |
| 2012/0226004 | A1 | 9/2012 | Xia et al. |

FOREIGN PATENT DOCUMENTS

| | | |
|---|---|---|
| EP | 1609805 A1 | 12/2005 |
| EP | 1840138 A1 | 10/2007 |
| JP | 10310605 A | 11/1998 |
| JP | 2010-248469 A | 11/2010 |
| WO | 2009152268 A1 | 12/2009 |

OTHER PUBLICATIONS

International Search Report and Written Opinion dated Jan. 27, 2014 in corresponding International Application No. PCT/EP2013/074465 (16 pages).

Correspondence reporting Official Letter and Search Report issued Jan. 12, 2015 in corresponding Taiwan application No. 102142053 (13 pages).

Invitation to Respond to Written Opinion and Written Opinion issued Feb. 23, 2016 in corresponding Singapore application No. 11201504141V (8 pages).

Notice of Rejection issued Jun. 28, 2016 in corresponding Japanese application No. 2015-543437 (w/translation) (19 pages).

Correspondence reporting First Office Action received in Chinese Patent Application No. 201380065805.8 (11 pages).

\* cited by examiner

HIGH PERFORMANCE ZIEGLER-NATTA CATALYST SYSTEMS, PROCESS FOR PRODUCING SUCH MGCL₂ BASED CATALYSTS AND USE THEREOF

CROSS-REFERENCE TO RELATED APPLICATIONS

This application, pursuant to 35 U.S.C. §119(e), claims priority to U.S. Provisional Application Ser. No. 61/729,895, filed Nov. 26, 2012. That application is incorporated by reference in its entirety.

FIELD OF THE DISCLOSURE

Embodiments disclosed herein relate generally to an improved Ziegler-Natta catalyst. In particular, embodiments herein relate to the use of such catalyst in the polymerization of olefins to polyolefins, and particularly to an improved method for making a Ziegler-Natta catalyst using diether compounds as internal donor.

BACKGROUND

Ziegler-Natta catalysts are generally composed of a catalyst support material and a transition metal component. The transition metal component is typically a substituted Group 4-8 transition metal, with titanium, zirconium, chromium or vanadium being commonly used. The transition metal is often provided as a metal halide, such as $TiCl_4$. Ziegler-Natta catalysts are used to effectively promote the high yield polymerization of olefins. In the polymerization of olefins, the catalyst is often used in combination with an organo-aluminum cocatalyst.

When used to catalyze polymerization of propylene, a third component has to be used in the catalyst. The third component is an electron donor used to control the stereoregularity of the polymer. It can be either incorporated into the catalyst during its synthesis (an internal donor), or it can be added to the polymerization reactor during the polymerization reaction (an external donor). In most polymerizations, both an internal donor and an external donor may be used. Various aromatic esters, diethers, succinates, alkoxysilanes and hindered amines are examples of compounds that have been used as internal donors.

One well known support material used in Ziegler-Natta catalysts is $MgCl_2$. The $MgCl_2$ material is sometimes complexed with ethanol (EtOH). In preparing the catalyst, typically most or all of the EtOH reacts with the transition metal halide, such as $TiCl_4$.

Methods of producing $MgCl_2$-xEtOH complexes, where x is the average number of EtOH molecules in the support material, are described in several patents. For example, U.S. Pat. No. 5,468,698 to Koshinen describes methods for preparing a $MgCl_2$-xEtOH support material. A molten $MgCl_2$-xEtOH complex (x=3.3 to 5.5) is sprayed into a heated chamber to form a particulate $MgCl_2$-xEtOH material in which x=2.0 to 3.2. Koskinen does not describe the composition of any particular catalyst made using the support material.

Catalysts utilizing $MgCl_2$-xEtOH supports are also described. For example, U.S. Pat. No. 4,829,034 to Iiskolan describes a Ziegler-Natta catalyst, and a method for making the catalyst, using a $MgCl_2$-xEtOH support in which x is about 3. In Iiskolan, the support material is first contacted with an internal donor, such as D-1-BP. The support D-1-BP complex is then combined with $TiCl_4$ to form the catalyst.

U.S. Pat. No. 6,020,279 to Uwai describes a method for making a Ziegler-Natta catalyst by producing a $MgCl_2$-xEtOH support in which x=1.5 to 2.1 and the support has an average particle diameter of 91 μm. The support is combined with a titanium halide, such as $TiCl_4$, and an internal electron donor for 10 minutes to 10 hours at 120° C. to 135° C. in the presence of an aliphatic solvent. As internal donors, esters like di-isobutyl-phthalate (Examples) are preferred.

While a variety of Ziegler-Natta catalysts have been developed, due to the importance of olefin polymerizations, there remains a need to develop catalysts having improved activity. Improving the activity of the catalyst leads to higher product yields and reduces the quantity of the catalyst required for the olefin polymerization reaction, which reduces the catalyst cost and the amount of catalyst impurities in the polymer (reduced ash content), resulting in polymers with a better performance profile.

Due to health, environment and safety concerns in connection with the use of phthalate containing Ziegler-Natta catalysts for the production of polymers with potential skin or food contact, a second driver to develop new Ziegler-Natta catalysts is the need to provide non-phthalate catalyst versions that produce polymers with an identical or at least very similar performance profile as the currently broadly used phthalate containing Ziegler-Natta catalysts.

Well known alternatives to Ziegler-Natta catalysts based on phthalates as internal donors are versions where various malonates, succinates or diether compounds are used. Unfortunately, the use of such alternative internal donors results in polymers with fully different performance profiles. As an example and a direct comparison, the use of a phthalate based Ziegler-Natta catalyst leads to polymers with a GPC Polydispersity Index (PI(GPC))(also referred to as Molecular Weight Distribution or Mw/Mn) in the range of 6.5 to 8, when using certain diethers as an internal donor the polydispersity is much more narrow (4.5 to 5.5), and when using succinate as internal donor the polydispersity is 10 to 15 (Polypropylene Handbook, $2^{nd}$ Edition, Editor: Nello Pasquini, Carl Hanser Verlag, Munich, 2005, page 18, Table 2.1 and P. Galli, G. Vecellio, Journal of Polymer Science: Part A: Polymer Chemistry, Vol. 42, 396-415 (2004), pages 404-405 and Table 1).

The molecular weight distribution is one of the most important properties of a polymer. By changing this parameter, the crystalline structure and the crystallization rate of a polymer is dramatically influenced, which has impact on the convertibility and usability of a certain polymer for a certain application. As an example, for extrusion applications like sheet, pipe, film, raffia, or thermoforming, a broader molecular weight distribution is advantageous, while for applications like fiber or injection molding a narrower molecular weight distribution would be advantageous. As used to processing polymers produced using phthalate based Ziegler-Natta catalysts, the converters insist in molecular weight distributions typically produced by such catalysts and expect that phthalate free Ziegler-Natta catalysts deliver a similar molecular weight distribution. Unfortunately, state of the art diether based catalysts deliver polymers where the molecular weight distribution is too narrow while succinate based catalysts deliver polymers where the molecular weight distribution is far too broad.

SUMMARY OF THE DISCLOSURE

Embodiments disclosed herein provide non-phthalate Ziegler-Natty catalyst systems for the polymerization and copolymerization of olefins that overcome the above shortcomings in the prior art and provide Ziegler-Natta catalyst systems with a unique method of selecting and combining the three essential components of a Ziegler-Natta catalyst, the support, the transition metal component, and the internal donor, as described below. The resulting Ziegler-Natta catalyst has unusually high activity, excellent hydrogen response and stereoselectivity while the molecular weight distribution is comparable to phthalate containing Ziegler-Natta catalysts.

Improved Ziegler-Natta catalyst may be formed according to embodiments herein using a spherical $MgCl_2$-xROH support, where R is a linear, cyclic or branched hydrocarbon unit with 1-10 carbon atoms and where ROH is an alcohol or a mixture of at least two different alcohols, preferably where the ROH is ethanol or a mixture of ethanol and a higher alcohol with R being a linear, cyclic or branched hydrocarbon unit with 3-10 carbon atoms, preferably 4-10 carbon atoms; and where x has a range of about 1.5 to 6.0, preferably about 2.0 to 4.0, more preferably about 2.5 to 3.5 and even more preferably 2.95 to 3.35.

The catalyst includes a Group 4-8 transition metal, such as Ti, and a diether compound as internal donor. The catalysts described herein have an improved activity performance in olefin polymerization reactions as well as good stereoregularity and hydrogen sensitivity while the molecular weight distribution is comparable to phthalate containing Ziegler-Natta catalysts.

Embodiments herein are also directed to methods of making the improved Ziegler-Natta catalyst. Generally, spherical $MgCl_2$-xROH (x=3.0-3.3) is treated with a transition metal halide, such as $TiCl_4$, at a low temperature (−10° C. to +10° C.). The reaction product is heated to approximately 80° C. and contacted with the diether compound. The resulting precatalyst is heated to about 105° C. and held at that temperature for a period of time, preferably about 1 to 3 hours. The reaction mixture is filtered and washed with an organic solvent. Then the solid catalyst is extracted with an organic solvent/$TiCl_4$ mixture at elevated temperature. The catalyst is washed with a solvent, such as heptane, and vacuum dried.

The improved catalyst described herein can be used to produce polypropylene or other polymerized olefins. The catalysts described herein exhibit an improved activity performance and hydrogen response, while producing polymers having good stereospecificity and morphology and a molecular weight distribution comparable to phthalate containing Ziegler-Natta catalysts.

Other aspects and advantages will be apparent from the following description and the appended claims.

BRIEF DESCRIPTION OF DRAWINGS

As shown in FIG. 2, the Soxhlet extractor is used to activate the catalyst. The extraction device includes a first vessel (40) with a main chamber (42) and a jacket (44). The jacket includes an inlet port (46) and an outlet port (48). To maintain the selected temperature in the main chamber, fluid at the desired temperature is pumped into the jacket through the inlet port, flows around the reaction chamber, and exits through the outlet port. A motor (50) drives a stirrer (52) within the main chamber (42). A refluxing condenser (54) is provided with a nitrogen purge source (56). A discharge port (58) is provided to allow fluids to be removed from the main chamber. An addition port (60) with a cap (62) is provided to allow the pre-catalyst reaction product to be added to the reaction chamber. A filter (72) is provided at the bottom of the main chamber to retain the solid pre-catalyst material. A port (64) is provided at the bottom of the reaction chamber (42) which provides a flow path to an extraction vessel (66). A plug (68) is provided to control flow from the reaction chamber to the extraction vessel. The extraction vessel sits within a heating mantle (70) which is used to heat the solvent (74) in the extraction vessel to reflux. The solvent vapor travels through a distillation line (76) into the main chamber (42). As the warm solvent fills the main chamber (42), the port (64) is opened to allow the solvent containing the catalyst to empty back into the extraction vessel.

DETAILED DESCRIPTION

Figure 2:
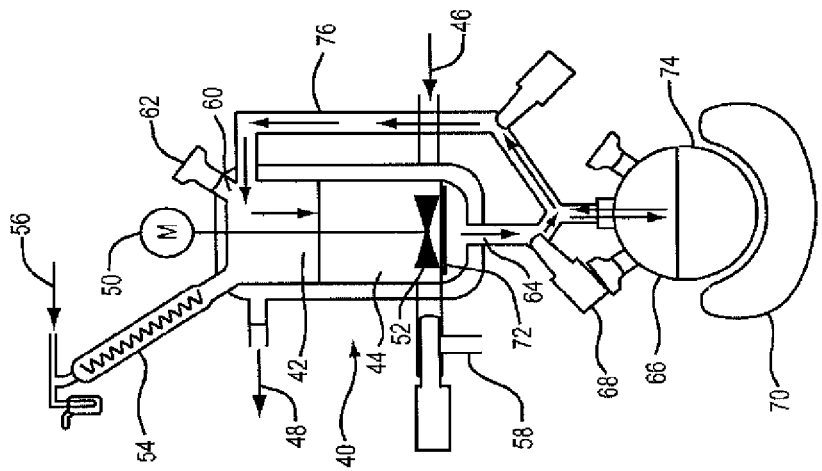
FIG. 2 is a diagram of an apparatus useful for extracting the activated catalyst according to embodiments herein from the pre-catalyst preparation.

In one aspect, embodiments disclosed herein relate to Ziegler-Natta catalysts useful for the polymerization of olefins. The improved Ziegler-Natta catalysts provided herein are formed using a spherical $MgCl_2$-xROH support, where R is a linear, cyclic or branched hydrocarbon unit with 1-10 carbon atoms and where ROH is an alcohol or a mixture of at least two different alcohols, preferably where the ROH is ethanol or a mixture of ethanol and a higher alcohol with R being a linear, cyclic or branched hydrocarbon unit with 3-10 carbon atoms, preferably 4-10 carbon atoms; and where x has a range of about 1.5 to 6.0, preferably about 2.0 to 4.0, more preferably about 2.5 to 3.5 and even more preferably 2.95 to 3.35.

This support material is referred to herein as the "spherical $MgCl_2$ support." The spherical $MgCl_2$ support may have any desired particle size. In preferred embodiments, the spherical $MgCl_2$ support has an average particle size ($d_{50}$) of between about 10 microns to 200 microns, preferably 20 microns and 150 microns, and more preferably between 30 microns to 120 microns, and even more preferably between 40 microns to 90 microns. The spherical $MgCl_2$ support may be produced according to U.S. Pat. No. 4,829,034 to Iiskolan and Koskinen or U.S. Pat. No. 5,905,050 to Koskinen and Louhelainen by spray-cooling of a molten $MgCl_2$-alcohol adduct.

The Ziegler-Natta catalysts described herein include a Group 4-8 transition metal, preferably a Group 4-6 transition metal. In preferred embodiments, the catalyst incorporates Ti, Zr, V or Cr, and most preferably Ti. The transition metal is typically provided in a halogenated form, such as a chloride, bromide or iodide. Titanium chloride is particularly preferred.

The Ziegler-Natta catalyst may be made by contacting the spherical $MgCl_2$ support with the transition metal component in a reactor at a low temperature, preferably +10° C. or less, with stirring. The reactor may be charged with the spherical $MgCl_2$ support and the transition metal component in either order, i.e. the spherical $MgCl_2$ support may be added first and then the transition metal component may be added, or vice versa but the addition of the spherical $MgCl_2$ support to the transition metal component is preferred. The transition metal component can be diluted with an aliphatic or aromatic organic solvent, preferably an aliphatic hydrocarbon, most preferably a linear aliphatic hydrocarbon like heptane or a mixture of branched hydrocarbons like ISOPAR-H. The spherical $MgCl_2$ support is added to the reactor over a period of time, preferably between about 4 minutes to about 300 minutes. The molar ratio of the Mg of the spherical $MgCl_2$ support to the transition metal is between 1:100 and 1:5, preferably between 1:50 and 1:5, and most preferably between 1:25 and 1:5.

The reaction product of the spherical $MgCl_2$ support and the transition metal component is slowly heated to a predetermined temperature of between about 30° C. and 100° C. In a preferred embodiment, the reactor is heated to a temperature of between about 40° C. and 90° C. over a period of about 2 hours. A diether compound as internal donor is added to the reactor when it reaches the predetermined temperature. This precatalyst is then further heated to a temperature of at least 80° C., preferably between 100° C. and 125° C., more preferably between 100° C. and 110° C. and held at that temperature for a predetermined period of time, preferably between about 10 minutes and three hours. The resulting mixture is then filtered while still hot to isolate the solid component. The solid component is washed with an organic solvent and then extracted at elevated temperatures using a mixture of an organic solvent and the transition metal component. It is preferred to apply the Soxhlet extraction method. The organic solvent can be an aliphatic or aromatic hydrocarbon, preferably an aromatic hydrocarbon and most preferably ethylbenzene which has the same boiling point of 136° C. than $TiCl_4$ which provides a constant ratio between $TiCl_4$ and the organic solvent in the gas phase and in the extraction zone.

In one embodiment, the procedure to make the Ziegler-Natta catalyst may include:
a) Reacting the $MgCl_2$-xROH with neat $TiCl_4$ at −30° C. to +40° C., more preferably at −20° C. to +20° C., even more preferably between −10° C. and +10° C. by slow addition of the $TiCl_4$ to the $MgCl_2$-xROH/organic solvent suspension while providing constant stirring.
b) Increasing the temperature of the above reaction mixture to between about 30° C. and 100° C., preferably between about 40 and 90° C., followed by addition of a diether donor compound and continuing to heat the mixture to at least 80° C. for about 1 to 3 hours.
c) Filtering the reaction mixture while still hot to obtain the solid precatalyst.
d) Extracting the precatalyst using the Soxhlet extraction method employing $TiCl_4$ and ethylbenzene (at a volume ratio of about 30:70, preferably 20:80, most preferably 10:90) for 1-5 hours, preferably 1-4 hours, most preferably 1-3 hours at a temperature of at least 100° C., preferably 100-135° C. most preferably 120-130° C.
e) Filtering and washing one or more times with a hydrocarbon like pentane, hexane or heptane, and then drying under vacuum and/or elevated temperature of 30-100° C., preferably 40-90° C., most preferably 50-80° C.

In a second embodiment, the method may include:
a) Preparing a cooled portion of neat $TiCl_4$ or of $TiCl_4$ diluted with a non aromatic hydrocarbon.
b) Reacting the neat or diluted $TiCl_4$ at −30° C. to +40° C., more preferably at −20° C. to +20° C., most preferably between −10° C. and +10° C. by slow addition of the preformed, spherical particles of $MgCl_2$-xROH while providing constant stirring.
c) Increasing the temperature of the reaction mixture to about 30 to 100° C., preferably to about 40 to 90° C., followed by addition of a diether compound as internal electron donor compound and continuing to heat the mixture to at least 80° C. for about 1 to 3 hours.
d) Filtering the reaction mixture while still hot to obtain the solid precatalyst.
e) Extracting the precatalyst using the Soxhlet extraction method employing $TiCl_4$ and ethylbenzene (at a volume ratio of about 30:70, preferably 20:80, most preferably 10:90) for 1-5 hours, preferably 1-4 hours, most preferably 1-3 hours at a temperature of at least 100° C., preferably 100-135° C. most preferably 120-130° C.
f) Filtering and washing one or more times with a hydrocarbon, like pentane, hexane or heptane, and then drying under vacuum and/or elevated temperature of 30-100° C., preferably 40-90° C., most preferably 50-80° C.

The Soxhlet extraction method is generally well known in the art. For example, as shown in FIG. 2, the precatalyst may be placed on a porous glass frit 72 and loaded into the main chamber of the Soxhlet extractor 40. The Soxhlet extractor 40 is placed onto a flask 66 containing the extraction solvent 74, such as a mixture of $TiCl_4$ and ethylbenzene. The Soxhlet is then equipped with a condenser 54. The solvent is heated via heater 70 to reflux. The solvent vapor travels up a distillation arm 76, and floods into the chamber 42 housing the frit 72 containing the solid precatalyst. The condenser 54 ensures that any solvent vapor cools, and drips back down into the glass jacketed chamber 42 housing the solid material, which may be maintained at a temperature in the range from about 100° C. to 135° C., most preferably 120 to 130° C. The chamber containing the precatalyst slowly fills with warm solvent 44. Any contaminants in the precatalyst will then dissolve in the warm solvent and drip back down to the heating chamber 66, leaving behind the catalyst. Other less preferred methods to extract the contaminants from the pre-catalyst include, but are not limited to washing steps with a mixture of an organic solvent and $TiCl_4$ at a temperature of at least 100° C., preferably 100-135° C., most preferably 120-130° C. The organic solvent can be an aliphatic or aromatic hydrocarbon, preferably an aromatic hydrocarbon and most preferably ethylbenzene. While this specification only refers to the Soxhlet extraction method, embodiments herein contemplate use of any extraction method that uses an organic solvent and a transition metal component in solution. As an example, for production of catalyst on a commercial scale, an agitated Nutsche Filter Dryer is recommended where the extraction followed by washing steps and the drying step can be applied in only one multipurpose unit without the need to transfer the crude solid to additional vessels.

The spherical $MgCl_2$-xROH support is better defined, where R is one or more of the following (provided that the total moles add up to "x"): a linear, cyclic or branched hydrocarbon unit with 1-10 carbon atoms and where ROH is an alcohol or a mixture of at least two different alcohols, preferably where the ROH is ethanol or a mixture of ethanol and a higher alcohol with R being a linear, cyclic or branched hydrocarbon unit with 3-10 carbon atoms like propanol, butanol, hexanol, heptanol or octanol, preferably 4-10 carbon atoms like butanol, hexanol, heptanol or octanol; and where x has a range of about 1.5 to 6.0, preferably about 2.0 to 4.0, more preferably about 2.5 to 3.5 and even more preferably 2.95 to 3.35. If ROH is a mixture of ethanol and a higher alcohol, the molar ratio of ethanol:higher alcohol is at least 80:20, preferably 90:10, most preferably 95:5.

Suitable diether internal donor compounds useful in embodiments herein may be represented by the general structure (I):

$$R^1O-(CR^5R^6)_n-CR^3R^4-(CR^7R^8)_m-OR^2 \quad (I)$$

wherein $R^1$ and $R^2$ are the same or different and are selected from the group consisting of a saturated or unsaturated aliphatic group of from 1 to about 20 carbon atoms or an aryl group of from 6 to about 20 carbon atoms, n+m=2 to 4, $R^3$, $R^4$, $R^5$, $R^6$, $R^7$ and $R^8$ are identical or different and are each a hydrogen atom, a linear, cyclic or branched hydrocarbon group, for example an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms or an arylalkenyl group of from 8 to about 40 carbon atoms and may contain one or more hetero atoms like Si, B, Al, O, S, N or P, and/or may contain halogen atoms like F, Cl or Br, and/or the two radicals $R^3$ and $R^4$ may form a hydrocarbon ring system. $R^3$ and/or $R^4$ are different from hydrogen.

Preferred diether internal donor compounds useful in embodiments herein may be 1,3-diether compounds represented by the structure (II):

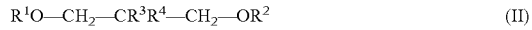

$$R^1O-CH_2-CR^3R^4-CH_2-OR^2 \quad (II)$$

wherein $R^1$ and $R^2$ are the same or different and are selected from the group consisting of a saturated or unsaturated aliphatic group of from 1 to about 20 carbon atoms, more preferably an alkyl group of from 1 to about 10 carbon atoms, even more preferably an alkyl group of from 1 to 4 carbon atoms, ideally a methyl or ethyl group, most ideally a methyl group, $R^3$ and $R^4$ are identical or different and are each a linear, cyclic or branched hydrocarbon group, for example an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms or an arylalkenyl group of from 8 to about 40 carbon atoms and may contain one or more hetero atoms like Si, B, Al, O, S, N or P, and/or may contain halogen atoms like F, Cl or Br, and/or the two radicals $R^3$ and $R^4$ may form a hydrocarbon ring system.

More preferably, diether internal donor compounds useful in embodiments herein may be 1,3-diether compounds represented by the structure (III):

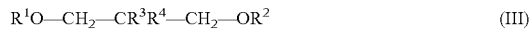

$$R^1O-CH_2-CR^3R^4-CH_2-OR^2 \quad (III)$$

wherein $R^1$ and $R^2$ are identical and are selected from the group consisting of an alkyl group of from 1 to about 10 carbon atoms, even more preferably an alkyl group of from 1 to 4 carbon atoms, ideally a methyl or ethyl group, most ideally a methyl group, $R^3$ and $R^4$ are identical or different and are each a linear, cyclic or branched hydrocarbon group, for example an alkyl group of from 1 to about 10 carbon atoms, an alkenyl group of from 2 to about 10 carbon atoms, an aryl group of from 6 to about 10 carbon atoms, an arylalkyl group of from 7 to about 40 carbon atoms, an alkylaryl group of from 7 to about 40 carbon atoms or an arylalkenyl group of from 8 to about 40 carbon atoms, and/or the two radicals $R^3$ and $R^4$ may form a hydrocarbon ring system, which may contain one or more hetero atoms like Si, O, S, N or P.

Examples of preferred diether electron donor compounds include: 2,2 di-cyclopentyl-1,3-dimethoxypropane; 2,2 di-(cyclopentylmethyl)-1,3-dimethoxypropane; 2,2-di-cylohexyl-1,3-dimethoxypropane; 2,2-di-(cylohexylmethyl)-1,3-dimethoxypropane; 2,2-di-norbornyl-1,3-dimethoxypropane; 2,2-di-phenyl-1,3 dimethoxypropane; 2,2-di-phenylmethyl-1,3-dimethoxypropane; 2,2-di-n-propyl-1,3-dimethoxypropane; 2,2-di-isopropyl-1,3-dimethoxypropane; 2,2-di-n-butyl-1,3-dimethoxypropane; 2,2-di-secbutyl-1,3-dimethoxypropane; 2,2-di-isobutyl-1,3-dimethoxypropane; 2,2-di-n-pentyl-1,3-dimethoxypropane; 2,2-di-(2-pentyl)-1,3-dimethoxypropane; 2,2-di-(3-pentyl)-1,3-dimethoxypropane; 2,2-di-(methylbutyl)-1,3-dimethoxypropane; 2,2-di-(3-methylbut-2-yl)-1,3-dimethoxypropane; 2,2-di-isopentyl-1,3-dimethoxypropane; 2,2-di-n-hexyl-1,3-dimethoxypropane; 2,2-di-2-hexyl-1,3-dimethoxypropane; 2,2-di-3-hexyl-1,3-dimethoxypropane; 2,2-di-(2-methylpentyl)-1,3-dimethoxypropane; 2,2-di-(3-methylpentyl)-1,3-dimethoxypropane; 2,2-di-(4-methylpentyl)-1,3-dimethoxypropane; 2-tertbutyl-1,3-dimethoxypropane; 2-ethyl-2-tertbutyl-1,3-dimethoxypropane; 2-n-propyl-2-tertbutyl-1,3-dimethoxypropane; 2-n-butyl-2-tertbutyl-1,3-dimethoxypropane; 2-isobutyl-2-tertbutyl-1,3-dimethoxypropane; 2-n-pentyl-2-tertbutyl-1,3-dimethoxypropane; 2-isopentyl-2-tertbutyl-1,3-dimethoxypropane; 2-n-hexyl-2-tertbutyl-1,3-dimethoxypropane; 2-ethyl-2-isopropyl-1,3-dimethoxypropane; 2-n-propyl-2-isopropyl-1,3-dimethoxypropane; 2-n-butyl-2-isopropyl-1,3-dimethoxypropane; 2-secbutyl-2-isopropyl-1,3-dimethoxypropane; 2-isobutyl-2-isopropyl-1,3-dimethoxypropane; 2-n-pentyl-2-isopropyl-1,3-dimethoxypropane; 2-(2-pentyl)-2-isopropyl-1,3-dimethoxypropane; 2-(3-pentyl)-2-isopropyl-1,3-dimethoxypropane; 2-methylbutyl-2-isopropyl-1,3-dimethoxypropane; 2-(3-methylbut-2-yl)-2-isopropyl-1,3-dimethoxypropane; 2-isopentyl-2-isopropyl-1,3-dimethoxypropane; 2-n-hexyl-2-isopropyl-1,3-dimethoxypropane; 2-(2-hexyl)-2-isopropyl-1,3-dimethoxypropane; 2-(3-hexyl)-2-isopropyl-1,3-dimethoxypropane; 2-(2-methylpentyl)-2-isopropyl-1,3-dimethoxypropane; 2-(3-methylpentyl)-2-isopropyl-1,3-dimethoxypropane; 2-(4-methylpentyl)-2-isopropyl-1,3-dimethoxypropane; 2-ethyl-2-cyclopentyl-1,3-dimethoxypropane; 2-n-propyl-2-cyclopentyl-1,3-dimethoxypropane; 2-isopropyl-2-cyclopentyl-1,3-dimethoxypropane; 2-n-butyl-2-cyclopentyl-1,3-dimethoxypropane; 2-isobutyl-2-cyclopentyl-1,3-dimethoxypropane; 2-secbutyl-2-cyclopentyl-1,3-dimethoxypropane; 2-n-pentyl-2-cyclopentyl-1,3-dimethoxypropane; 2-(2-pentyl)-2-cyclopentyl-1,3-dimethoxypropane; 2-(3-pentyl)-2-cyclopentyl-1,3-dimethoxypropane; 2-methylbutyl-2-cyclopentyl-1,3-dimethoxypropane; 2-(3-methylbut-2-yl)-2-cyclopentyl-1,3-dimethoxypropane; 2-ethyl-2-cyclohexyl-1,3-dimethoxypropane; 2-n-propyl-2-cyclohexyl-1,3-dimethoxypropane; 2-isopropyl-2-cyclohexyl-1,3-dimethoxypropane; 2-n-butyl-2-cyclohexyl-1,3-dimethoxypropane; 2-isobutyl-2-cyclohexyl-1,3-dimethoxypropane; 2-secbutyl-2-cyclohexyl-1,3-dimethoxypropane; 2-n-pentyl-2-cyclohexyl-1,3- dimethoxypropane; 2-(2-pentyl)-2-cyclohexyl-1,3-dimethoxypropane; 2-(3-pentyl)-2-cyclohexyl-1,3-dimethoxypropane; 2-methylbutyl-2-cyclohexyl-1,3-dimethoxypropane; 2-(3-methylbut-2-yl)-2-cyclohexyl-1,3-dimethoxypropane; and the corresponding 1,3-diethoxypropane analogues.

A further group of suitable diether internal donor compounds include: 9,9-bis(methoxymethyl)fluorene; 9,9-bis(methoxymethyl)-2,3,6,7-tetramethylfluorene; 9,9-bis(methoxymethyl)-2,7-dimethylfluorene; 9,9-bis(methoxymethyl)-2,7-diisoproylfluorene; 9,9-bis(methoxymethyl)-2,7-ditertbutylfluorene; 9,9-bis(methoxymethyl)-2,8-dimethylfluorene; 9,9-bis(methoxymethyl)-3,6-dimethylfluorene; 9,9-bis(methoxymethyl)-3,6-ditertbutylfluorene; 9,9-bis(methoxymethyl)-3,6-diisopropylfluorene; 9,9-bis(methoxymethyl)-4,5-dimethylfluorene; 9,9-bis(methoxymethyl)-2-methylfluorene; 9,9-bis(methoxymethyl)-4-methylfluorene; 9,10-dihydro-9,9-dimethoxyanthracene; 9,10-dihydro-9,9-diethoxyanthracene; 9,9-Dimethoxyxanthene; 9,9-Diethoxyxanthene; and the corresponding 9,9-bis(ethoxymethyl)-ananalogues.

Preferably, the diether electron donor is a compound, such as 2,2-di-isobutyl-1,3-dimethoxypropane; 2,2-di-isopropyl-1,3-dimethoxypropane; 2,2-di-cyclopentyl-1,3 dimethoxypropane; 2-isopropyl-2-isopentyl-1,3-dimethoxypropane; 2-isopropyl-2-isobutyl-1,3-dimethoxypropane; 2-isopropyl-2-cyclopentyl-dimethoxypropane; 2-ethyl-2-tert-butyl-1,3-dimethoxypropane or the corresponding 1,3-diethoxypropane analogues or 9,9-bis(methoxymethyl)fluorene or 9,9-bis(ethoxymethyl)fluorene.

Also, mixtures of two or more diether internal electron donor compounds may be used in the preparation of the solid catalytic component according to embodiments herein.

When used in the preparation of the particulate solid component, the diether donor compound may be used in an amount of from about 0.01 to about 2 mole, preferably from about 0.05 to about 0.6 mole, more preferably from about 0.1 to about 0.3 mole for each mole of the magnesium halide compound.

The Catalytic System:

The catalytic systems described herein, in addition to the solid catalytic component, further include at least one aluminum compound as co-catalyst. In addition to the aluminum compound(s) the catalytic systems described herein preferably include at least one external electron donor compound.

Examples of suitable aluminum compounds include aluminum trialkyls and derivatives thereof wherein an alkyl group is substituted by an alkoxy group or a halogen atom, e.g., chlorine or bromine atom. The alkyl groups may be the same or different. The alkyl groups may be linear or branched chain alkyl groups. Preferred trialkylaluminum compounds are those wherein the alkyl groups each have 1 to 8 carbon atoms, such as trimethylaluminum, triethylaluminum, tri-isobutylaluminum, trioctylaluminum or methyldiethylaluminum.

Examples of external electron donor compounds that may be used in the catalytic systems herein include mono- and poly-functional carboxylic acids, carboxylic anhydrides and carboxylic esters, ketones, ethers, alcohols, lactones, as well as organic phosphorus and silicon compounds. Also, a mixture of two or more external electron donor compounds may be used. The external electron donor compound and the internal electron donor compound used in the preparation of the solid catalyst component may be the same or different.

Preferred external electron donor compounds are organo-silicon compounds of general formula (IV)

$$R^9{}_a Si(OR^{10})_{4-a} \qquad (IV)$$

wherein each of the $R^9$ radicals which may be the same or different, represent C1-C20 alkyl groups, 5- to 7-membered cyclic alkyl groups optionally substituted with C1-C10 alkyl, C6-C18 aryl groups or C6-C18 arylalkyl or alkylaryl groups and the $R^{10}$ radicals may be the same or different and are C1-C20 alkyl groups and a is the integer 1, 2 or 3.

Preferred compounds of formula (IV) are diisopropyldimethoxysilane, dimethyldimethoxysilane, tetramethoxysilane, tetraethoxysilane, di(tert-butyl)dimethoxysilane, isobutyl(isopropyl)dimethoxysilane, diisobutyldimethoxysilane, dicyclopentyldimethoxysilane, cyclohexyl(methyl)dimethoxysilane, dicyclohexyldimethoxysilane, isopropyl(tert-butyl)dimethoxysilane, isopropyl(sec-butyl)dimethoxysilane, isobutyl(sec-butyl)dimethoxysilane, bicyclo[2.2.1]heptan-2-yl dimethoxy-(methyl)silane, bicyclo[2.2.1]heptan-2-yl trimethoxysilane, and di(bicyclo[2.2.1]heptan-2-yl)dimethoxysilane.

Preparation of the Catalytic System

To prepare the catalytic systems described herein, the aluminum compound as co-catalyst and/or the external electron donor compound may be contacted with the solid catalytic component separately in any order or mixed together, normally at a temperature in the range of from about 0° C. to 200° C., preferably from about 20° C. to about 90° C. and a pressure of from about 1 to about 100 bar, in particular from about 1 to about 40 bar.

Preferably, the aluminum compound co-catalyst is added in such an amount that the atomic ratio of the aluminum compound to the transition metal of the solid catalytic component is from about 10:1 to about 800:1, in particular from about 20:1 to about 200:1.

Polymerization

The catalytic systems described herein may be advantageously used in the polymerization of alk-1-enes. Suitable alk-1-enes include linear or branched C2-C10 alkenes, in particular linear C2-C10 alk-1-enes such as ethylene, propylene, but-1-ene, pent-1-ene, hex-1-ene, hept-1-ene, oct-1-ene non-1-ene, dec-1-ene or 4-methylpent-1-ene. Mixtures of these alk-1-enes may be polymerized as well.

The catalytic systems described herein, including the solid catalytic component and as co-catalyst an aluminum compound or an aluminum compound and preferably an external electron donor compound, are excellent catalytic systems for use in the production of propylene polymers, both homo polymers of propylene as well as co-polymers of propylene and one or more further alk-1-enes having up to 10 carbon atoms. The term co-polymers as used herein also refers to co-polymers wherein the further alk-1-ene having up to 10 carbon atoms is incorporated randomly. In these co-polymers in general the co-monomer content is less than about 15% by weight. The copolymers may also be in the form of so-called block or impact copolymers, which in general comprise at least a matrix of a propylene homo polymer or propylene random co-polymer containing less than 15% by weight of a further alk-1-ene having up to 10 carbon atoms and a soft phase of a propylene co-polymer (rubber phase) containing 15% to 80% by weight of further alk-1-enes having up to 10 carbon atoms. Also, mixtures of co-monomers are contemplated, resulting in, for example, ter-polymers of propylene.

The production of propylene polymers may be carried out in any common reactor suitable for the polymerization of alk-1-enes, either batchwise or, preferably, continuously, i.e., in solution, as suspension polymerization including the bulk polymerization in liquid monomer, or as gas phase polymerization. Examples of suitable reactors include continuously stirred reactors, loop reactors, fluid bed reactors, and horizontal or vertical stirred powder bed reactors. It will be understood that the polymerization may be carried out in a series of consecutively coupled reactors. The reaction time depends on the chosen reaction conditions. In general, the reaction time is from about 0.2 to about 20 hours, usually from about 0.5 to about 10 hours most preferably between 0.5 and 2 hours.

In general, the polymerization is carried out at a temperature in the range of from about 20° C. to about 150° C., preferably from about 50° C. to about 120° C., and more preferably from about 60° C. to about 95° C., and a pressure in the range of from about 1 to 100 bar, preferably from about 15 to about 50 bar, and more preferably from about 20 to about 45 bar.

The molecular weight of the resulting polymers may be controlled and adjusted over a wide range by adding polymer chain transfer or termination agents as commonly used in the art of polymerization, such as hydrogen. In addition, an inert solvent, such as toluene or hexane, or an inert gas, such as nitrogen or argon, and smaller amounts of a powdered polymer, e.g., polypropylene powder, may be added.

The weight average molecular weights of the propylene polymers produced by using the catalytic systems described herein in general are in the range of from about 10,000 to 2,000,000 g/mole and the melt flow rates are in the range of from about 0.01 to 2000 g/10 min, preferably from about 0.1 to 100 g/10 min. The melt flow rate corresponds to the amount which is pressed within 10 minutes from a test instrument in accordance with ISO 1133 at a temperature of 230° C. and under a load of 2.16 kg. Certain applications might require different molecular weights than mentioned above and are contemplated to be included within the scope of embodiments herein.

The catalytic systems described herein enable polymerization of alk-1-enes producing polymers having a good morphology and a high bulk density when compared with the prior art catalytic systems. In addition, the catalytic systems may show a dramatic increase of productivity.

Catalyst systems using diether internal donors according to embodiments herein may be used to produce propylene polymers having a molecular weight distribution greater than the molecular weight distribution achieved by prior art catalysts including diethers as an internal donor. For example, catalysts described herein may be used to produce a propylene polymer having a molecular weight distribution (PI(GPC)) of greater than about 5.75 in some embodiments; greater than 6 in other embodiments; greater than 6.25 or 6.5 in yet other embodiments; in the range from about 5.75 to about 9.5 in some embodiments; in the range from about 6 to about 9 in other embodiments; and in the range from about 6.5 to about 8 in yet other embodiments.

Molecular weight properties like the molecular weight distribution (PI(GPC)) can be measured at 145° C. using an Alliance/GPCV2000 instrument equipped with a refractometer and a triple capillary on-line viscometer (Waters Corporation), having a combination of three mixed-bed columns (Agilent/Polymer Labs PLgel 10 μm Mixed-B) and a guard column (Agilent/Polymer Labs PL gel 10 μm). Polymer solutions with concentration of 1.7 mg/ml are prepared in 1,2-dichlorobenzene (stabilized with 800 ppm 2,6-di-tert-butyl-4-methylphenol) by heating the polymer samples for two hours at 160° C. The injection volume is 300 and the solvent flow rate is 0.5 ml/min. The instrument is calibrated using ten polystyrene standard materials (ReadyCal Kit by PSS). Data acquisition and processing is done using the Waters Millenium software and the Universal Calibration curve.

Due to their good mechanical properties, the polymers obtainable by using the catalytic systems disclosed herein, and in particular the propylene homo polymers or the co-polymers of propylene with one or more further alk-1-enes having up to 10 C-atoms, can be used advantageously for the production of films, fibers or moldings and in particular for the production of films.

EXAMPLES

Catalyst Synthesis

The general procedure and the equipment used for the synthesis of the catalysts (catalytic components) of the present invention is described in patent application WO 2009/152268 A1, while the description of exemplary embodiments are not intended to limit the scope of the invention in any way.

Figure 1:
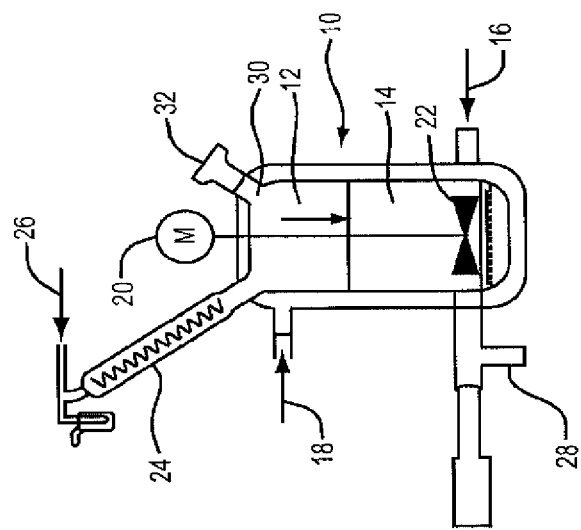
FIG. 1 is a diagram of an apparatus useful for preparing catalysts according to embodiments herein through the pre-catalyst stage. The reactor vessel (10) includes a reaction chamber (12) and a jacket (14). The jacket includes an inlet port (16) and an outlet port (18). To maintain the selected temperature in the reaction chamber, fluid at the desired temperature is pumped into the jacket through the inlet port, flows around the reaction chamber, and exits through the outlet port. A motor (20) drives a stirrer (22) within the reaction chamber (12). A refluxing condenser (24) is provided with a nitrogen purge source (26). A discharge port (28) is provided to remove the reaction product from the reaction chamber. An addition port (30) with a cap (32) is provided to allow the components to be added to the reaction chamber.

Catalysts were made using sixty micron support (d50) with a span [d50/(d90–d10)] of 0.8 of spherical $MgCl_2$-xEtOH, where x is 3.1. If not mentioned otherwise, for each catalyst preparation a mixture of 70 vol. % $TiCl_4$ and 30 vol. % Heptane were initially charged to the glass reactor (see FIG. 1) and cooled down to temperatures of about −5° C. Then the $MgCl_2$-3.1EtOH support was added over a period of about 45 min, while maintaining temperatures below 0° C. The molar ratio of Mg/Ti used is provided for each catalyst. The molar ratio of Mg/Ti is between 1:100 and 1:5, preferably between 1:50 and 1:5 and most preferably between 1:25 and 1:5.

While the actual quantities of the initial charges vary slightly for each catalyst preparation run, the initial charge was based on using 10 g of $MgCl_2$-3.1EtOH support, unless noted otherwise. After the $MgCl_2$ support addition, the temperature was increased at approximately 1° C. per minute to 50° C. or to 80° C. Then the internal donor (ID), e.g. diether or D-1-BP (di-1-butyl phthalate) was added. The molar ratio of the internal donor (ID) to Mg is provided for each catalyst. The molar ratio of ID/Mg is in a range of from about 0.01 to about 2 moles, preferably from about 0.05 to about 0.6 mole, more preferably from about 0.1 to about 0.3 mole.

If not mentioned otherwise, the suspension was directly heated to 105° C. and held there for 1 to 3 hours. Afterwards the reactor contents were transferred to a Soxhlet extraction device (see FIG. 2), filtered while still hot and then washed with heptane. Then, the precatalyst was Soxhlet-extracted for approximately 2 hours with a 90/10 volume mixture of ethylbenzene and $TiCl_4$ at the boiling temperature of the mixture. After extraction, the catalyst was washed three times with 100 ml heptane and vacuum dried for 2 h, which results in a residual solvent content of less than 2 wt. % for the catalytic components and comparative catalysts.

One or more parameters were varied for each catalyst preparation. The parameters used and any change from the procedure are noted as follows:

Catalyst 1:

The molar ratio of Mg/Ti was 1:21. As internal donor 2-isopropyl-2-isopentyl-dimethoxypropane with an ID/Mg ratio of 0.25 was added at 80° C. The suspension was allowed to react at 105° C. for 1.5 hours.

Catalyst 2:
The molar ratio of Mg/Ti was 1:21. As internal donor 2-isopropyl-2-isopentyl-dimethoxypropane with an ID/Mg ratio of 0.35 was added at 80° C. The suspension was allowed to react at 105° C. for 3 hours.

Catalyst 3:
The molar ratio of Mg/Ti was 1:20. As internal donor 2-isopropyl-2-isopentyl-dimethoxypropane with an ID/Mg ratio of 0.25 was added at 80° C. The suspension was allowed to react at 105° C. for 3 hours.

Catalyst 4:
The molar ratio of Mg/Ti was 1:20. As internal donor 2-isopropyl-2-isopentyl-dimethoxypropane with an ID/Mg ratio of 0.15 was added at 80° C. The suspension was allowed to react at 105° C. for 3 hours.

Catalyst 5:
The molar ratio of Mg/Ti was 1:20. As internal donor 2-isopropyl-2-isobutyl-dimethoxypropane with an ID/Mg ratio of 0.25 was added at 80° C. The suspension was allowed to react at 105° C. for 3 hours.

Catalyst 6:
The molar ratio of Mg/Ti was 1:20. As internal donor 2-isopropyl-2-cyclopentyl-dimethoxypropane with an ID/Mg ratio of 0.25 was added at 80° C. The suspension was allowed to react at 105° C. for 3 hours.

Catalyst 7:
The molar ratio of Mg/Ti was 1:20. As internal donor 2,2-dicyclopentyl-dimethoxypropane with an ID/Mg ratio of 0.25 was added at 80° C. The suspension was allowed to react at 105° C. for 3 hours.

Catalyst 8:
The molar ratio of Mg/Ti was 1:20. As internal donor 2,2-diisopropyl-dimethoxypropane with an ID/Mg ratio of 0.25 was added at 80° C. The suspension was allowed to react at 105° C. for 3 hours.

Catalyst 9:
The molar ratio of Mg/Ti was 1:20. As internal donor 2,2-diisobutyl-dimethoxypropane with an ID/Mg ratio of 0.25 was added at 80° C. The suspension was allowed to react at 105° C. for 3 hours.

Catalyst 10:
The molar ratio of Mg/Ti was 1:20. As internal donor 2,2-diisobutyl-diethoxypropane with an ID/Mg ratio of 0.25 was added at 80° C. The suspension was allowed to react at 105° C. for 3 hours.

Catalyst 11:
The molar ratio of Mg/Ti was 1:20. As internal donor 9,9-Bis(methoxymethyl)fluorene with an ID/Mg ratio of 0.25 was added at 80° C. After addition of the internal donor the suspension was held at 80° C. for 1 hour. Then the suspension was allowed to react at 105° C. for 1 hour.

Catalyst 12:
The molar ratio of Mg/Ti was 1:20. As internal donor 9,9-Bis(methoxymethyl)fluorene with an ID/Mg ratio of 0.25 was added at 80° C. After addition of the internal donor the suspension was held at 80° C. for 1 hour. Then the suspension was allowed to react at 105° C. for 3 hour.

Catalyst 13:
The molar ratio of Mg/Ti was 1:10, while 20 g of the support was added over 90 min. As internal donor 9,9-Bis(methoxymethyl)fluorene with an ID/Mg ratio of 0.25 was added at 80° C. After addition of the internal donor the suspension was held at 80° C. for 1 hour. Then the suspension was allowed to react at 105° C. for 3 hour.

Catalyst 14:
The molar ratio of Mg/Ti was 1:21. As internal donor 9,9-Bis(methoxymethyl)fluorene with an ID/Mg ratio of 0.15 was added at 50° C. After addition of the internal donor the suspension was held at 50° C. for 1 hour. Then the suspension was allowed to react at 105° C. for 1.5 hour. After heptane wash, the precatalyst was not Soxhlet extracted. Instead the solid was treated two times with 150 ml TiCl4 at 125° C. for 2 hours.

Catalyst 15:
The molar ratio of Mg/Ti was 1:10, while 20 g of the support was added over 90 min. As internal donor 9,9-Bis(methoxymethyl)fluorene with an ID/Mg ratio of 0.25 was added at 80° C. After addition of the internal donor the suspension was held at 80° C. for 1 hour. Then the suspension was allowed to react at 105° C. for 1 hour. After ethylbenzene wash, the precatalyst was not Soxhlet extracted. Instead the solid was treated two times with a mixture of 50 ml TiCl4 and 100 ml ethylbenzene at 125° C. for 2 hours.

Synthesis of Non-Inventive Catalysts Using Phthalate as Internal Donor (ID)

Comparative Catalyst A:
The molar ratio of Mg/Ti was 1:10, while 20 g of the support was added over 90 min. As internal donor di-iso-butyl-phthalate with an ID/Mg ratio of 0.25 was added at 50° C. After addition of the internal donor the suspension was held at 50° C. for 1 hour. Then the suspension was allowed to react at 105° C. for 1.5 hour.

Comparative Catalyst B:
The molar ratio of Mg/Ti was 1:10, while 20 g of the support was added over 90 min. As internal donor di-iso-butyl-phthalate with an ID/Mg ratio of 0.15 was added at 50° C. After addition of the internal donor the suspension was held at 50° C. for 1 hour. Then the suspension was allowed to react at 105° C. for 1.5 hour.

The titanium, magnesium and carbon content by weight percentage of the catalytic components are summarized in Table 1. The comparative examples are found at the bottom of the table.

TABLE 1

Ti, Mg AND C - CONTENT OF CATALYS

| Catalyst | Ti [wt. %] | Mg [wt. %] | C [wt. %] |
| --- | --- | --- | --- |
| 1 | 2.2 | 17.8 | 15.9 |
| 2 | 2.4 | 17.6 | 15.4 |
| 3 | 2.4 | 17.5 | 15.7 |
| 4 | 4.9 | 16.1 | 13.5 |
| 5 | 2.1 | 17.2 | 14.8 |
| 6 | 1.7 | 15.8 | 18.1 |
| 7 | 5.1 | 11.7 | 21.0 |
| 8 | 2.1 | 16.8 | 13.5 |
| 9 | 2.2 | 17.6 | 15.5 |
| 10 | 4.4 | 17.7 | 9.5 |
| 11 | 2.6 | 14.8 | 25.1 |
| 12 | 3.4 | 13.1 | 26.4 |
| 13 | 3.5 | 14.5 | 24.3 |
| 14 | 4.7 | 14.2 | 22.6 |
| 15 | 2.4 | 14.7 | 25.6 |
| Comp. catalyst A | 3.6 | 13.7 | 18.4 |
| Comp. catalyst B | 2.0 | 17.9 | 11.5 |

Polymerization Testing

The performance of the catalytic components and the catalyst systems in comparison with the comparative phthalate-based catalysts was tested under both bulk polymerization and gas phase polymerization conditions.

If not mentioned otherwise, bulk polymerization testing was performed using a 5-liter reactor equipped with a helical stirrer, 1800 grams of propylene, optionally 2.0 ml external electron donor compound, 9.0 ml of 1.3 M triethylaluminum (TEAL), and 0.5 grams of hydrogen, which were added to the reactor at 25° C. in the following order: after addition of hydrogen, TEAl and optionally silane were premixed and then flushed into the reactor using 900 grams of propylene. The last component added were the approximately 0.01 grams of catalyst using the remaining 900 grams of propylene. Under constant stirring at 200 rpm, the reactor was then heated quickly to 70° C., usually within 10 minutes, and the polymerization run was allowed to proceed for 1 hour in liquid propylene as suspension medium.

The same bench scale reactor which was used for the bulk polymerizations was used for the gas phase polymerizations. If not mentioned otherwise, under gas phase conditions the order of addition was the same, but the propylene charges are reduced in size to approximately 180 grams, while 2.5 ml TEAl, optionally an external donor compound and 0.1 g hydrogen were added. The catalyst was injected at 40° C. and the reactor programmed to heat to 75° C. over 10 minutes. Gas phase conditions were maintained by controlling the introduction of the propylene into the system. As the system was heated up to final temperature, the propylene was added at a rate to ensure that the pressure in the reactor vessel is such that the propylene always remains in the gas phase. To insure gas phase conditions, the reactor pressure was maintained at 26.7 bar at 75° C. with gaseous propylene being added through a mass flow meter upon demand.

As external donor compounds cyclohexyl-(methyl)-dimethoxysilane and dicyclopentyl-dimethoxysilane were used; below indicated by C and D, respectively. For the polymerization all external donors were diluted with heptane, obtaining a 0.1 M solution.

The physical characteristics of the polypropylene polymers produced using the various catalysts and/or catalyst systems were determined using the tests described below.

Activity.

The activity results reported throughout this study are based upon polymer yield in kilograms divided by the weight of the catalyst charged to the reactor in grams for a 1-hour polymerization.

Xylene Solubles (wt % XS).

Xylene solubles were measured using Viscotek's Flow Injector Polymer Analysis (FIPA) technique which is well known in the industry. Viscotek has published an article entitled, "*FIPA for xylene soluble determination of polypropylene and impact copolymers*" (which may be ordered from the Viscotek website, http://www.viscotek.com/applications.aspx) showing that the Viscotek FIPA method exhibits a 0.994 $r^2$ correlation with ASTM Method D5492-06 (equivalent to ISO 16152) over the range of 0.3% to 20% Xylene solubles. Therefore, one of ordinary skill in the art could reproduce the inventive results using either the Viscotek FIPA method or ASTM Method D5492-06. The weight percent of xylene solubles in the polypropylene is an indication of the stereoregulating ability of the catalyst component or catalyst system—the higher the wt % XS, the lower the stereospecificity of the catalyst. While higher XS values are required for applications like the BOPP film production process, low XS values are of value for applications like injection moulding.

Melt Flow Rate (MFR) Measurement.

The melt flow rate effect was measured using ASTM Method D 1238-04. For each 5 gram sample of polymer, 0.2 grams of a standard stabilizing package was added. The additive package consists of 50 wt. % Irganox 1010 and 50 wt. % Irgafos 168. Because the polymer is exposed to air at 230° C. for several minutes during the test, this package is added to inhibit thermal and oxidative degradation of the polymer. The melt flow rate provides information concerning the molecular weight of the polymer and the hydrogen response of the catalyst. The higher the MFR, the higher the hydrogen response rate of the catalyst that produced the polyolefin. Similarly, the higher the MFR, the lower the molecular weight of the polymer.

Molecular Weight Distribution (MWD).

The polydispersity index (PI) can be determined by Gel Permeation Chromatography (GPC) and/or rheological methods using a dynamic shear test, the so called Dynamic Oscillatory Rate Sweep (DORS). It is well known in the art that the PI obtained by DORS is lower than by GPC.

The High Temperature Gel Permeation Chromatograph (GPC-IR, PolymerChar (Valencia, Paterna 46980, Spain)), with IR-4 infrared detector was equipped with three Polymer Laboratories PLgel 10 µm Mixed-BLS columns. The instrument was operated with 1,2 dichlorobenzene at 150° C. and a flow rate of 1.0 cm³/min. The separation efficiency of the column set is calibrated using a series of narrow MWD polystyrene standards reflecting the expected Mw range of the sample being analyzed and the exclusion limits of the column set 14 individual polystyrene standards, ranging from Peak Molecular Weight (Mp) 376 to 9,290,000, were used to generate the calibration curve. The average molecular weight and the polydispersity index were determined according to ISO 16014.

For the Dynamic Oscillatory Rate Sweep (DORS) test a sample in the form of a compression molded disk is loaded between a parallel plate-to-plate geometry. The measurements were performed at T=210° C. in a frequency range between 0.1 and 400 rad/s. The Polydispersity Index (PI) is calculated from the crossover modulus as follows: $PI=10^5 Pa/G_c$, where $G_c$=dynamic storage modulus (G')=dynamic loss modulus (G") at the crossover frequency.

Activity of the Catalysts Based Upon Polymerization Testing

Tables 2 and 3 summarize the bulk and gas phase polymerization results, respectively, that were obtained with the catalytic components of the present invention described above. The usage of silane C as external electron donor compound (ED) is indicated in column 3. The comparative examples are found at the bottom of the tables.

TABLE 2

BULK PHASE POLYMERIZATION RESULTS

| Example | Catalyst | ED | Activity [KgPP/ g-cat.] | MFR/ [g/10 min] | XS/ [wt. %] | PI (DORS) |
|---|---|---|---|---|---|---|
| 1 | 1 | — | 73.5 | 52.4 | 0.7 | 4.1 |
| 2 | 2 | — | 79.1 | 46.7 | 1.2 | 4.0 |
| 3 | 3 | — | 68.7 | 89.0 | 1.9 | 4.0 |
| 4 | 4 | — | 61.5 | 136.3 | 9.1 | 5.2 |
| 5 | 5 | — | 48.3 | 90.2 | 1.0 | 4.1 |
| 6 | 6 | — | 36.8 | 38.7 | 0.7 | 4.0 |
| 7 | 7 | — | 60.0 | 20.2 | 0.6 | 4.2 |
| 8 | 8 | — | 44.8 | 111.7 | 3.1 | 4.6 |
| 9 | 9 | — | 60.3 | 107.3 | 3.0 | 4.1 |
| 10 | 11 | — | 54.6 | 81.9 | 2.2 | 4.2 |
| 11 | 12 | — | 89.4 | 64.6 | 3.8 | 4.0 |
| 12 | 13 | — | 81.3 | 90.4 | 3.7 | 4.0 |
| 13 | 14 | — | 54.3 | 121.3 | 8.8 | 4.1 |
| 14 | 15 | — | 53.5 | 74.6 | 1.4 | 4.0 |
| Comp. 1 | Comp. catalyst A | — | 21.6 | 525.6 | 33.5 | 4.1 |
| Comp. 2 | Comp. catalyst A | C | 47.1 | 31.1 | 2.2 | 4.2 |

TABLE 3

GAS PHASE POLYMERIZATION RESULTS

| Example | Catalyst | ED | Activity [KgPP/g-cat.] | MFR/ [g/10 min] | XS/ [wt. %] | PI (DORS) |
|---|---|---|---|---|---|---|
| 15 | 1 | — | 35.4 | 9.3 | 1.2 | 4.5 |
| 16 | 2 | — | 31.3 | 8.2 | 1.8 | 3.7 |
| 17 | 3 | — | 31.8 | 10.8 | 2.4 | 4.0 |
| 18 | 4 | — | 28.6 | 22.9 | 9.4 | 4.3 |
| 19 | 5 | — | 18.8 | 15.5 | 1.8 | 4.0 |
| 20 | 6 | — | 17.0 | 8.9 | 1.3 | 3.9 |
| 21 | 7 | — | 25.0 | 6.5 | 1.2 | 4.1 |
| 22 | 8 | — | 18.6 | 21.2 | 2.5 | 4.3 |
| 23 | 9 | — | 17.6 | 20.5 | 3.8 | 4.7 |
| 24 | 10 | — | 38.6 | 28.5 | 21.1 | 4.1 |
| 25 | 11 | — | 43.3 | 20.0 | 1.7 | 3.8 |
| 26 | 12 | — | 39.3 | 11.9 | 4.6 | 3.9 |
| 27 | 13 | — | 54.4 | 25.4 | 3.7 | 3.8 |
| 28 | 14 | — | 39.1 | 21.3 | 7.0 | 3.8 |
| 29 | 15 | — | 31.5 | 16.2 | 1.7 | 4.0 |
| Comp. 3 | Comp. catalyst A | — | 16.6 | 61.9 | 29.3 | 4.0 |
| Comp. 4 | Comp. catalyst A | C | 30.4 | 10.0 | 1.2 | 3.9 |

The results in Table 2 and 3 clearly show that the exemplary diether-based catalysts of the present invention exhibited significantly higher activity and stereo selectivity without silane as external electron donor compound in the polymerization process than the comparative catalyst A, while the polydispersity index (PI) is unexpectedly comparable for all catalysts.

A high stereo selectivity with a catalyst containing phthalate, e.g. comparative catalysts A can be obtained only in the presence of an external electron donor compound. Simultaneously with the decrease of the XS value the activity increases significantly. Compared to the phthalate-based catalyst and silane system some catalysts containing a diether component as internal donor show a comparable or even higher activity over a broad XS range with an excellent hydrogen response. For example under bulk polymerization condition catalyst 11 shows an activity of 54.6 kg/gcat without any stereo modifier and comparative catalyst A shows an activity of 47.1 kg/gcat in the presence of a silane, while the XS and PI values of both homo polymers are comparable (see example 10 and Comp. Example 2).

The stereo selectivity of the catalysts can be adjusted by various synthesis parameters. One is the amount of diether component as internal donor used for the synthesis, exemplary shown with catalytic components 2 to 4 (see example 2 to 4 and 16 to 18). Here with increasing ID/Mg ratio during the synthesis the stereo selectivity increases, resulting in lower XS value in the polymer, see table 2 and 3. Other exemplary parameters are the reaction time and temperature (80 or 105° C.), the Mg/Ti ratio as well as the applied activation procedure.

Table 4 summarizes gas phase polymerization results that were obtained with the diether-based catalysts of the present invention described above and a silane as external donor of the catalytic system. For the polymerization 0.05 g of hydrogen and 0.3 ml silane were added. As external electron donor compound the silanes C or D were used.

TABLE 4

GAS PHASE POLYMERIZATION RESULTS

| Example | Catalyst | ED | Activity [KgPP/g-cat.] | MFR/ [g/10 min] | XS/ [wt. %] | PI (DORS) |
|---|---|---|---|---|---|---|
| Comp. 5 | Comp. catalyst A | C | 28.3 | 6.5 | 1.5 | 4.5 |
| Comp. 6 | Comp. catalyst B | C | 27.9 | 6.2 | 1.3 | 4.1 |
| Comp. 7 | Comp. catalyst B | D | 30.6 | 0.5 | 0.6 | 4.3 |
| 30 | 12 | C | 25.2 | 5.8 | 2.9 | 4.3 |
| 31 | 12 | D | 20.4 | 5.4 | 2.5 | 4.5 |
| 32 | 11 | D | 15.3 | 6.5 | 1.1 | 4.1 |
| 33 | 3 | D | 14.9 | 4.2 | 1.3 | 4.7 |
| 34 | 1 | D | 17.7 | 3.2 | 0.9 | 5.0 |

Table 4 shows that in contrast to the comparative catalysts A and B in the presence of a silane the activities of the diether-based catalyst decrease (Example 26 vs. example 30). Surprisingly, the presence of silane does not influence the polydispersity index of the resulting polymer, which is not expected by one of ordinary skill in the art. On the contrary, it would be expected that the PI decreases in the following order: catalyst containing phthalate and silane system>catalyst containing a diether component>catalyst containing a diether component and silane system (Polypropylene Handbook, $2^{nd}$ Edition, Editor: Nello Pasquini, Carl Hanser Verlag, Munich, 2005, page 18, Table 2.1 and P. Galli, G. Vecellio, Journal of Polymer Science: Part A: Polymer Chemistry, Vol. 42, 396-415 (2004), pages 404-405 and Table 1)

Independent of the polymerization condition, e.g. bulk or gas phase polymerization or with and without a silane, the polydispersity index of PP produced with diether-based catalysts synthesized in accordance to the present invention is comparable to PP produced with a comparative catalyst containing phthalate, see Tables 2 to 4. The average PI obtained with DORS of all inventive examples where diether components are used as internal donor (Examples 1 to 34) is 4.2, which matches the average PI (4.2) of all comparative examples where phthalates are used as internal donor (Comp. examples 1-7).

Additionally to dynamic shear test (DORS), the polydispersity index was determined with GPC. Table 5 summarizes these PIs obtained with both methods.

TABLE 5

MOLECULAR WEIGHT DISTRIBUTION

| Example | Catalyst | MFR [g/10 min] | PI (DORS) | PI (GPC) |
|---|---|---|---|---|
| 7 | 7 | 20.2 | 4.2 | 7.9 |
| 16 | 2 | 9.3 | 3.7 | 6.4 |
| 17 | 3 | 8.2 | 4.0 | 8.0 |
| 20 | 6 | 8.9 | 3.9 | 7.3 |
| 21 | 7 | 6.5 | 4.1 | 7.3 |
| 27 | 13 | 25.4 | 3.8 | 7.5 |
| Comp. 4 | Comp. catalyst A | 8.2 | 3.9 | 6.3 |
| Comp. 6 | Comp. catalyst B | 6.2 | 4.1 | 6.6 |

For both methods the polydispersity index can be obtained. Table 5 shows that the PI determined by DORS is lower than by GPC, which is well known in the art.

The obtained PI (GPC) values of the comparative catalysts containing phthalate are in the expected range. Quite contrary to the expectation and to the consent in the literature, the PI (GPC) values of polypropylene obtained with diether-based catalyst systems produced according to the present invention are in the same range as PP obtained with phthalate-based catalysts (Comp. Examples 4 and 6 vs. Examples 7, 16, 17, 20, 21 and 27). One of ordinary skill in the art, would expect values of between 5 to 5.5 for the diether-based catalyst systems, while values of between 6.5 to 8 for phthalate-based catalyst systems are expected (Polypropylene Handbook, 2nd Edition, Editor: Nello Pasquini, Carl Hanser Verlag, Munich, 2005, page 18, Table 2.1 and P. Galli, G. Vecellio, Journal of Polymer Science: Part A: Polymer Chemistry, Vol. 42, 396-415 (2004), pages 404-405 and Table 1).

Figure 3:
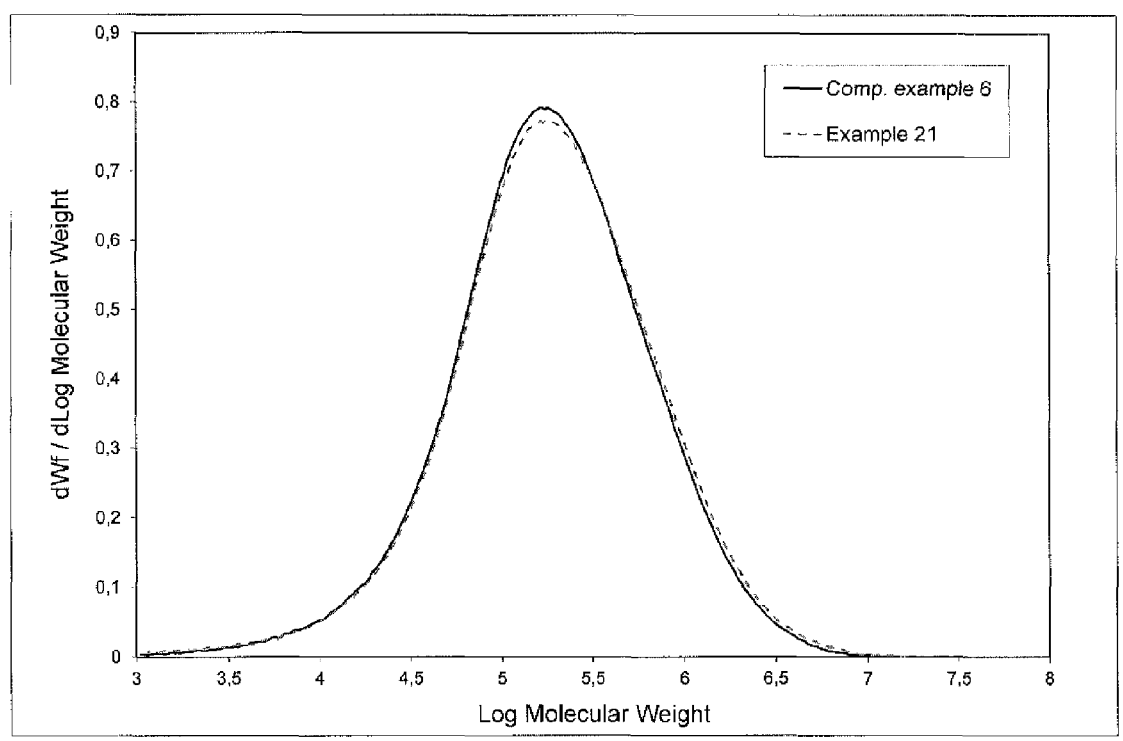
FIG. 3 compares GPC curves of polymers made in accordance with embodiments herein with that of a comparative example.

FIG. 3 compares GPC curves of Example 21 and Comp. Example 6 where the polymers have almost the same MFR (see Table 5). The shape of both curves is almost identical resulting in comparable PI (GPC) values of 6.6 and 7.3.

The polydisperisty index obtained with DORS and/or GPC lead to the same conclusion that the PIs of polymers obtained using catalysts containing a diether component produced according to the present invention and non-inventive phthalate-based catalysts are comparable, while all catalysts give a polydispersity index PI (GPC) of >=5.75.

As described above, embodiments disclosed herein provide for unique catalysts using diethers as an internal electron donor. Advantageously, embodiments disclosed herein may provide for improved catalytic systems of the Ziegler-Natta type with an excellent hydrogen response and stereoselectivity while the molecular weight distribution is comparable to phthalate containing Ziegler-Natta catalysts. In addition, the catalyst has a high activity and allows the production of polymers of α-alk-1-enes having a good morphology and bulk density.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for producing a Ziegler-Natta catalyst for the polymerization of olefins comprising the steps of:
   a. combining a spherical spray-cooled $MgCl_2$-xROH support, wherein x is in the range of from about 1.5 to about 6.0 and ROH is an alcohol or a mixture of alcohols where R is a linear, cyclic, or branched hydrocarbon unit with 1-10 carbon atoms, with a transition metal compound in a reactor at a temperature of between about −30° C. and +40° C.;
   b. heating the mixture in the reactor to a temperature of between about 30° C. to about 100° C.;
   c. concurrent with the heating in step (b), or following reaching the temperature of step (b), adding an internal electron donor consisting essentially of a diether compound to the mixture in the reactor, wherein the diether is selected such that the resulting catalyst has an activity and hydrogen response resulting in the production of propylene polymers having a molecular weight distribution in the range from about 5.75 to about 9;
   d. heating the resulting mixture to at least about 80'C, and holding the resulting mixture at that temperature for about 1 to 3 hours to produce a pre-catalyst;
   e. filtering the mixture containing the pre-catalyst while still hot to obtain the solid pre-catalyst component;
   f. extracting the pre-catalyst with a mixture of an organic solvent and a transition metal compound at a temperature of at least 100° C. for 1-5 hours to form a catalyst; and
   g. washing the catalyst with a hydrocarbon solvent and drying the catalyst under vacuum and/or elevated temperature of 30-100° C.

2. The process of claim 1, wherein the diether compound has the general structure (I):

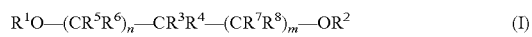

$$R^1O-(CR^5R^6)_n-CR^3R^4-(CR^7R^8)_m-OR^2 \quad (I)$$

where
$R^1$ and $R^2$ are the same or different and are selected from the group consisting of a saturated or unsaturated aliphatic group of from 1 to about 20 carbon atoms or an aryl group of from 6 to about 20 carbon atoms,
$n+m=2$ to 4,
$R^3$, $R^4$, $R^5$, $R^6$, $R^7$ and $R^8$ are identical or different and are each a hydrogen atom, a linear, cyclic or branched hydrocarbon group and optionally contain one or more hetero atoms and/or halogen atoms, and/or the two radicals $R^3$ and $R^4$ may form a hydrocarbon ring system, and $R^3$ and/or $R^4$ are different from hydrogen.

3. The process of claim 1, wherein the diether compound has the general structure (II):

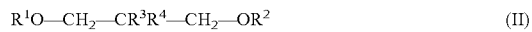

$$R^1O-CH_2-CR^3R^4-CH_2-OR^2 \quad (II)$$

where
$R^1$ and $R^2$ are the same or different and are selected from the group consisting of a saturated or unsaturated aliphatic group of from 1 to about 20 carbon atoms,
$R^3$ and $R^4$ are identical or different and are each a linear, cyclic or branched hydrocarbon group, and optionally contain one or more hetero atoms and/or halogen atoms, and/or the two radicals $R^3$ and $R^4$ may form a hydrocarbon ring system.

4. The process of claim 1, wherein the diether compound has the general structure (III):

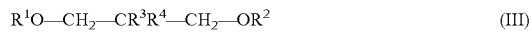

$$R^1O-CH_2-CR^3R^4-CH_2-OR^2 \quad (III)$$

where
$R^1$ and $R^2$ are identical and are selected from the group consisting of an alkyl group of from 1 to about 10 carbon atoms,
$R^3$ and $R^4$ are identical or different and are each a linear, cyclic or branched hydrocarbon group, and/or the two radicals $R^3$ and $R^4$ may form a hydrocarbon ring system optionally containing one or more hetero atoms.

5. The process of claim 1, wherein the diether compound comprises at least one of 2,2 di-cyclopentyl-1,3-dimethoxypropane; 2,2 di-(cyclopentylmethyl)-1,3-dimethoxypropane; 2,2-di-cylohexyl-1,3-dimethoxypropane; 2,2-di-(cylohexylmethyl)-1,3-dimethoxypropane; 2,2-di-norbornyl-1,3-dimethoxypropane; 2,2-di-phenyl-1,3-dimethoxypropane; 2,2-di-phenylmethyl-1,3-dimethoxypropane; 2,2-di-n-propyl-1,3-dimethoxypropane; 2,2-di-isopropyl-1,3-dimethoxypropane; 2,2-di-n-butyl-1,3-dimethoxypropane; 2,2-di-secbutyl-1,3-dimethoxypropane; 2,2-di-isobutyl-1,3-dimethoxypropane; 2,2-di-n-pentyl-1,3-dimethoxypropane; 2,2-di-(2-pentyl)-1,3-dimethoxypropane; 2,2-di-(3-pentyl)-1,3-dimethoxypropane; 2,2-di-(methylbutyl)-1,3-dimethoxypropane; 2,2-di-(3-methylbut-2-yl)-1,3-dimethoxypropane; 2,2-di-isopentyl-1,3-dimethoxypropane; 2,2-di-n-hexyl-1,3-dimethoxypropane; 2,2-di-2-hexyl-1,3-dimethoxypropane; 2,2-di-3-hexyl-1,3-dimethoxypropane; 2,2-di-(2-methylpentyl)-1,3-dimethoxypropane; 2,2-di-(3-methylpentyl)-1,3-dimethoxypropane; 2,2-di-(4-methylpentyl)-1,3-dimethoxypropane; 2-tertbutyl-1,3-dimethoxypropane; 2-ethyl-2-tertbutyl-1,3-dimethoxypropane; 2-n-propyl-2-tertbutyl-1,3-dimethoxypropane; 2-n-butyl-2-tertbutyl-1,3-dimethoxypropane; 2-isobutyl-2-tertbutyl-1,3-dimethoxypropane; 2-n-pentyl-2-tertbutyl-1,3-dimethoxypropane; 2-isopentyl-2-tertbutyl-1,3-dimethoxypropane; 2-n-hexyl-2-tertbutyl-1,3-dimethoxypropane; 2-ethyl-2-isopropyl-1,3-dimethoxypropane; 2-n-propyl-2-isopropyl-1,3-dimethoxypropane; 2-n-butyl-2-isopropyl-1,3-dimethoxypropane; 2-secbutyl-2-isopropyl-1,3-dimethoxypropane; 2-isobutyl-2-isopropyl-1,3-dimethoxypropane; 2-n-pentyl-2-isopropyl-1,3-dimethoxypropane; 2-(2-pentyl)-2-isopropyl-1,3-dimethoxypropane; 2-(3-pentyl)-2-isopropyl-1,3-dimethoxypropane; 2-methylbutyl-2-isopropyl-1,3-dimethoxypropane; 2-(3-methylbut-2-yl)-2-isopropyl-1,3-dimethoxypropane; 2-isopentyl-2-isopropyl-1,3-dimethoxypropane; 2-n-hexyl-2-isopropyl-1,3-dimethoxypropane; 2-(2-hexyl)-2-isopropyl-1,3-dimethoxypropane; 2-(3-hexyl)-2-isopropyl-1,3-dimethoxypropane; 2-(2-methylpentyl)-2-isopropyl-1,3-dimethoxypropane; 2-(3-methylpentyl)-2-isopropyl-1,3-dimethoxypropane; 2-(4-methylpentyl)-2-isopropyl-1,3-dimethoxypropane; 2-ethyl-2-cyclopentyl-1,3-dimethoxypropane; 2-n-propyl-2-cyclopentyl-1,3-dimethoxypropane; 2-isopropyl-2-cyclopentyl-1,3-dimethoxypropane; 2-n-butyl-2-cyclopentyl-1,3-dimethoxypropane; 2-isobutyl-2-cyclopentyl-1,3-dimethoxypropane; 2-secbutyl-2-cyclopentyl-1,3-dimethoxypropane; 2-n-pentyl-2-cyclopentyl-1,3-dimethoxypropane; 2-(2-pentyl)-2-cyclopentyl-1,3-dimethoxypropane; 2-(3-pentyl)-2-cyclopentyl-1,3-dimethoxypropane; 2-methylbutyl-2-cyclopentyl-1,3-dimethoxypropane; 2-(3-methylbut-2-yl)-2-cyclopentyl-1,3-dimethoxypropane; 2-ethyl-2-cyclohexyl-1,3-dimethoxypropane; 2-n-propyl-2-cyclohexyl-1,3-dimethoxypropane; 2-isopropyl-2-cyclohexyl-1,3-dimethoxypropane; 2-n-butyl-2-cyclohexyl-1,3-dimethoxypropane; 2-isobutyl-2-cyclohexyl-1,3-dimethoxypropane; 2-secbutyl-2-cyclohexyl-1,3-dimethoxypropane; 2-n-pentyl-2-cyclohexyl-1,3-dimethoxypropane; 2-(2-pentyl)-2-cyclohexyl-1,3-dimethoxypropane; 2-(3-pentyl)-2-cyclohexyl-1,3-dimethoxypropane; 2-methylbutyl-2-cyclohexyl-1,3-dimethoxypropane; 2-(3-methylbut-2-yl)-2-cyclohexyl-1,3-dimethoxypropane; and the corresponding 1,3-diethoxypropane analogues.

6. The process of claim 1, wherein the diether compound comprises at least one of 9,9-bis(methoxymethyl)fluorene; 9,9-bis(methoxymethyl)-2,3,6,7-tetramethylfluorene; 9,9-bis(methoxymethyl)-2,7-dimethylfluorene; 9,9-bis(methoxymethyl)-2,7-diisoproylfluorene; 9,9-bis(methoxymethyl)-2,7-ditertbutylfluorene; 9,9-bis(methoxymethyl)-2,8-dimethylfluorene; 9,9-bis(methoxymethyl)-3,6-dimethylfluorene; 9,9-bis(methoxymethyl)-3,6-ditertbutylfluorene; 9,9-bis(methoxymethyl)-3,6-diisopropylfluorene; 9,9-bis(methoxymethyl)-4,5-dimethylfluorene; 9,9-bis(methoxymethyl)-2-methylfluorene; 9,9-bis(methoxymethyl)-4-methylfluorene; 9,10-dihydro-9,9-dimethoxyanthracene; 9,10-dihydro-9,9-diethoxyanthracene; 9,9-Dimethoxyxanthene; 9,9-Diethoxyxanthene; and the corresponding 9,9-bis(ethoxymethyl)-analogues.

7. The process of claim 1, wherein the diether compound comprises at least one of 2,2-di-isobutyl-1,3-dimethoxypropane; 2,2-di-isopropyl-1,3-dimethoxypropane; 2,2-di-cyclopentyl-1,3-dimethoxypropane; 2-isopropyl-2-isopentyl-1,3-dimethoxypropane; 2-isopropyl-2-isobutyl-1,3-dimethoxypropane; 2-isopropyl-2-cyclopentyl-1,3-dimethoxypropane; 2-ethyl-2-tert-butyl-1,3-dimethoxypropane or the corresponding 1,3-diethoxypropane analogues or 9,9-bis(methoxymethyl)fluorene or 9,9-bis(ethoxymethyl)fluorene.

8. The process of claim 1, wherein the diether donor compound is used in an amount of from about 0.01 to about 2 mole for each mole of the magnesium halide compound.

9. A catalyst produced by the process of claim 1.

10. A process for the polymerization of olefins of formula CH2=CHR$^1$, in which R$^1$ is hydrogen or a hydrocarbon radical having 1-12 carbon atoms carried out in the presence of a catalyst according to claim 9.

11. The process of claim 3, wherein R$^1$ and R$^2$ are the same or different and are selected from the group consisting of an alkyl group of from 1 to about 10 carbon atoms.

12. The process of claim 3, wherein R$^1$ and R$^2$ are the same or different and are selected from the group consisting of an alkyl group of from 1 to 4 carbon atoms.

13. The process of claim 3, wherein R$^1$ and R$^2$ are the same or different and are selected from the group consisting of a methyl or ethyl group.

14. The process of claim 3, wherein R$^1$ and R$^2$ are each a methyl group.

15. The process of claim 4, wherein R$^1$ and R$^2$ are identical and are selected from the group consisting of an alkyl group of from 1 to 4 carbon atoms.

16. The process of claim 4, wherein R$^1$ and R$^2$ are identical and are selected from the group consisting of a methyl or ethyl group.

17. The process of claim 4, wherein R$^1$ and R$^2$ are each a methyl group.

* * * * *